United States Patent
Fike

(10) Patent No.: US 6,716,013 B2
(45) Date of Patent: Apr. 6, 2004

(54) TEAR RESISTANT SHIELD FOR A TREAD SEGMENT OF A SEGMENTED TIRE MOLD

(76) Inventor: Louis T. Fike, 2905 Fragancia Ave., Hacienda Heights, CA (US) 91745

( * ) Notice: Subject to any disclaimer, the term of this patent is extended or adjusted under 35 U.S.C. 154(b) by 85 days.

(21) Appl. No.: 10/057,190

(22) Filed: Jan. 25, 2002

(65) Prior Publication Data

US 2003/0143294 A1 Jul. 31, 2003

(51) Int. Cl.[7] .............................................. B29C 35/02
(52) U.S. Cl. ............................................................ 425/46
(58) Field of Search ................................. 425/46, 47, 195

(56) References Cited

U.S. PATENT DOCUMENTS

| | | | |
|---|---|---|---|
| 3,479,693 A | * | 11/1969 | Cantarutti .................... 425/46 |
| 3,703,346 A | | 11/1972 | Doboeur et al. |
| 3,741,696 A | | 6/1973 | Greenwood |
| 3,778,203 A | | 12/1973 | MacMillan |
| 3,787,155 A | | 1/1974 | Zangl |
| 3,797,979 A | | 3/1974 | Greenwood |
| 3,833,323 A | | 9/1974 | Pasch |
| 3,847,520 A | | 11/1974 | Plumhans |
| 3,854,853 A | | 12/1974 | Mirtain |
| 3,864,504 A | | 2/1975 | Greenwood |
| 4,059,375 A | | 11/1977 | Koch et al. |
| 4,174,940 A | | 11/1979 | Pizzorno |
| 4,726,749 A | | 2/1988 | Katsumata |
| 4,741,683 A | | 5/1988 | Hilke et al. |
| 5,141,424 A | | 8/1992 | Christof |
| 5,204,036 A | | 4/1993 | MacMillan |
| 5,449,483 A | | 9/1995 | Greenwood et al. |
| 5,585,064 A | | 12/1996 | Moris-Herbeuval et al. |
| 5,676,980 A | * | 10/1997 | Gulka et al. .................... 425/46 |
| 5,851,557 A | | 12/1998 | Pouille et al. |

* cited by examiner

Primary Examiner—James P. Mackey
(74) Attorney, Agent, or Firm—Fulwider, Patton, Lee & Utecht

(57) ABSTRACT

A tear resistant shield for a segmented tire mold. The shield is removably positioned within a cavity formed in the outer surface of each tread segment of the mold to prevent tearing of the outer surface of each tread segment relative to the inner surface of the bowl of such segmented mold.

9 Claims, 14 Drawing Sheets

FIG. 4

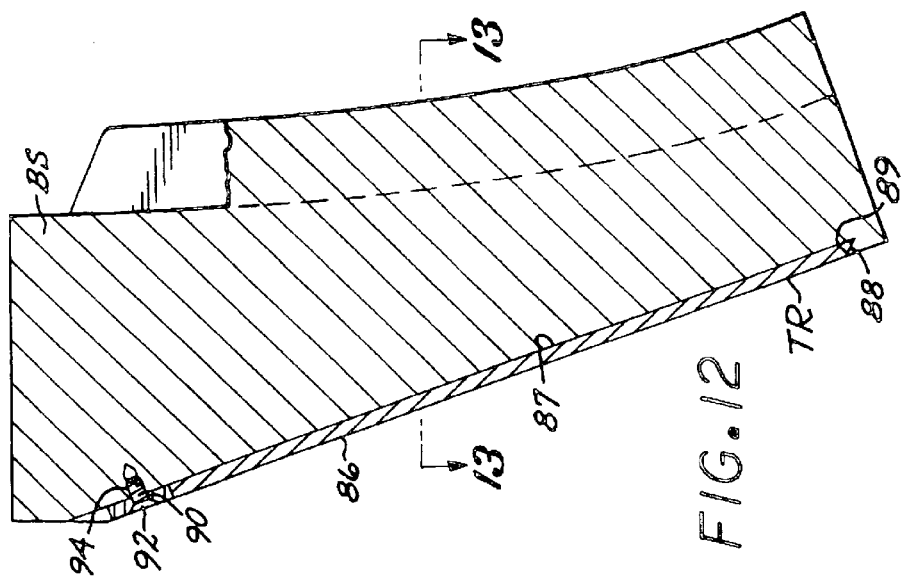
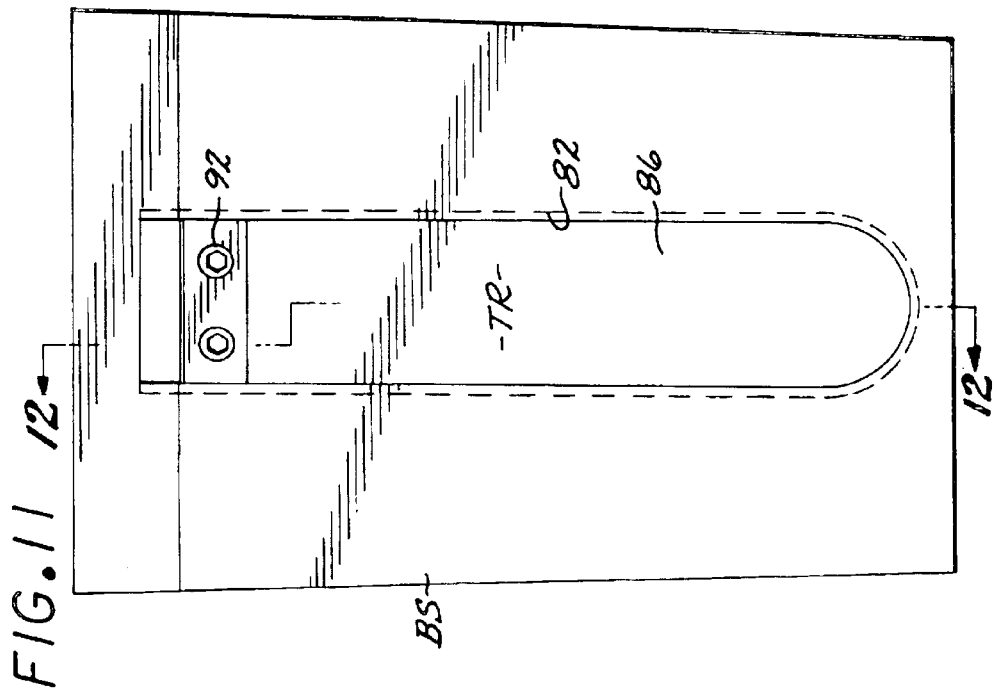

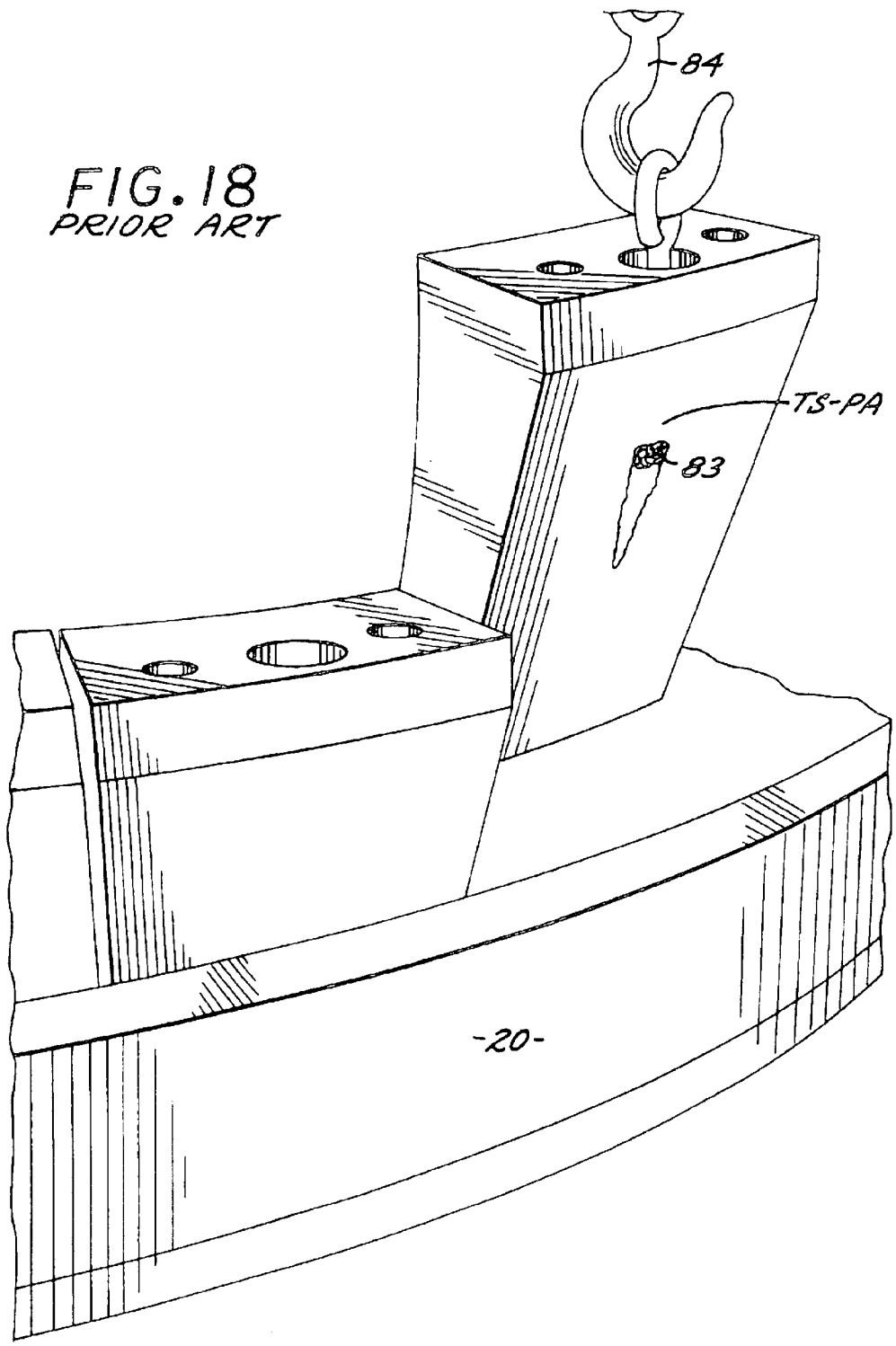

TEAR RESISTANT SHIELD FOR A TREAD SEGMENT OF A SEGMENTED TIRE MOLD

FIELD OF THE INVENTION

The present invention relates generally to segmental molds for curing pneumatic tires.

BACKGROUND OF THE INVENTION

A conventional type of segmented mold for curing pneumatic tires utilizes upper and lower mold sections, with the top mold section being vertically movable with respect to the bottom mold section between a raised open position and a lower closed position. The interior of the top and bottom mold sections are bowl-shaped and each contain a plurality of arcuate tread segments arranged in a circular pattern. The tread segments are each formed with radially inwardly extending tread groove-defining lugs. When the top mold section is in its open raised position, the tread segments of the mold section are arranged radially outwardly of the outer diameter of the uncured tire to be molded. When the top mold section is moved to its closed lower position, the tread segments of both the top and bottom mold sections are automatically cammed radially inwardly by the sloping sides of the bowls of such mold sections so that the tread-defining lugs of die segments engage the uncured crown of the tire during curing of the tire. As the tread segments of the lower mold section move radially inwardly they travel downwardly along the sloping sides of the lower mold section bowl. When the tire has been cured, the top mold section is raised and the upper and lower tread segments automatically move outwardly from the cured tire so that such tire can be withdrawn from the bottom mold section. Examples of segmental molds are shown in U.S. Pat. No. 5,676,980 to Gulka at al., U.S. Pat. No. 3,787,155 to Zangl, and U.S. Pat. No. 3,806,288 to Materick. Another example of a segmental mold is shown in my U.S. patent application Ser. No. 09/948,398 filed Sep. 6, 2001, now U.S. Pat. No. 6,632,393.

The top and bottom mold sections of a segmental mold are generally formed of steel while the tread segments are formed of aluminum, steel or iron. The tire curing operation requires that the mold sections be heated to a high temperature, with heat from the mold sections being transferred to the tread segments. The outer surface of the tread segments have a curvature which match the inner arcuate surface of the lower and upper mold sections only when the tread segments have traveled inwardly to their closed tire molding position. When the tread segments are arranged in their open position the curvature of their outer surface is less than the curvature of the inner surface of their respective mold sections. Accordingly, the contact area between the rear outer surface of the tread segments and the inner surface of the bowl of the mold sections varies as the tread segments travel vertically towards their fully closed position within the bowls of the lower and upper mold section bowls, such contact area being narrow at the open position of the tread segments and being about equal to the width of the tread segments when the tread segments are at their closed position. As the tread segments slide vertically along the sloping sides of the lower and upper mold sections' bowl their lugs engage the uncured circumferential area of the tire being molded causing the uncured rubber of the tire to force the tread segments radially outward with considerable pressure. Simultaneously, vertical travel of the tread segments create a radially inwardly directed force upon the tread segments causing the tread segments to generate considerable friction as they slide along the inner surface of the steel bowls of the open lower mold segments. Where the tread segments are formed of aluminum, such friction can often result in an instantaneous binding of a small area of the aluminum material on the outer surface of a tread segment to the inner surface of the steel material of the mold segment bowl. This binding can effect instantaneous tearing of a portion of the tread segment aluminum material out of the outer surface of such tread segment. When this occurs, particles of the aluminum material will be torn away from the rear surface of the tread segments so as to define a vertically extending groove in the outer surface of the tread segment as the tread segment undergoes vertical travel towards its closed position. The aluminum particles torn out of the groove balls-up in the space between the outer surface of the tread segment and the inner surface of the mold bowl, so as to wedge the affected tread segment radially inward away from contact with the bowl creating a gap between the outer surface of the tread segment and the inner surface of the bowl. Such gap blocks the flow of heat from the mold section into the damaged tread segment whereby the temperature of the tread segment adjacent the gap is reduced to the extent that undercuring of the tire can occur adjacent the gap. Also, since the damaged tread segment is forced radially inwardly away from the bowl, the tire assumes an out-of-round shape when it is being cured. It then becomes necessary to remove the affected tread segment from the mold bowl, file off the balled-up tread segment material, apply new lubricant to the rear surface of the tread segments as well as the inner surface of the mold section bowl, and replace the repaired tread segment in the bowl. These corrective operations are labor intensive and also precludes use of the mold to cure tires during such corrective operations. If the tread segments are formed of steel, such segments can weld to the bowl as they slide along the inner surface of the bowl.

SUMMARY OF THE INVENTION

The present invention is directed to a tear resistant shield attached to the rear surface of the tread segments of a segmental mold which slidably engage the inner surface of the steel bowl of the lower and upper mold sections as the tread segment undergoes vertical travel relative to such bowl so as to effectively eliminate binding of the tread segment material to the steel material and thereby prevent tearing of a groove in the aluminum tread segment. The shield is fabricated of a non-metallic material which eliminates the damaging friction which can occur when two metallic surfaces undergo sliding under high pressures. When the shield becomes worn it may be readily replaced with a new shield.

Further advantages afforded by the present invention will become apparent from the following detailed description when taken in conjunction with the accompanying drawings.

BRIEF DESCRIPTION OF THE DRAWINGS

FIG. 4 is a view similar to FIGS. 2 and 3 showing the top mold section being lowered towards its closed position above the bottom mold section;

FIG. 11 is a front elevational view showing a tread segment provided with a tear resistant shield embodying the present invention;

FIG. 12 is a sectional view taken along line 12—12 of FIG. 11;

FIG. 18 is a perspective view showing a damaged tread segment being lifted out of the lower mold section for repair of a tear formed on the inner surface of such tread segment.

DETAILED DESCRIPTION OF A PREFERRED EMBODIMENT

Figure 1:
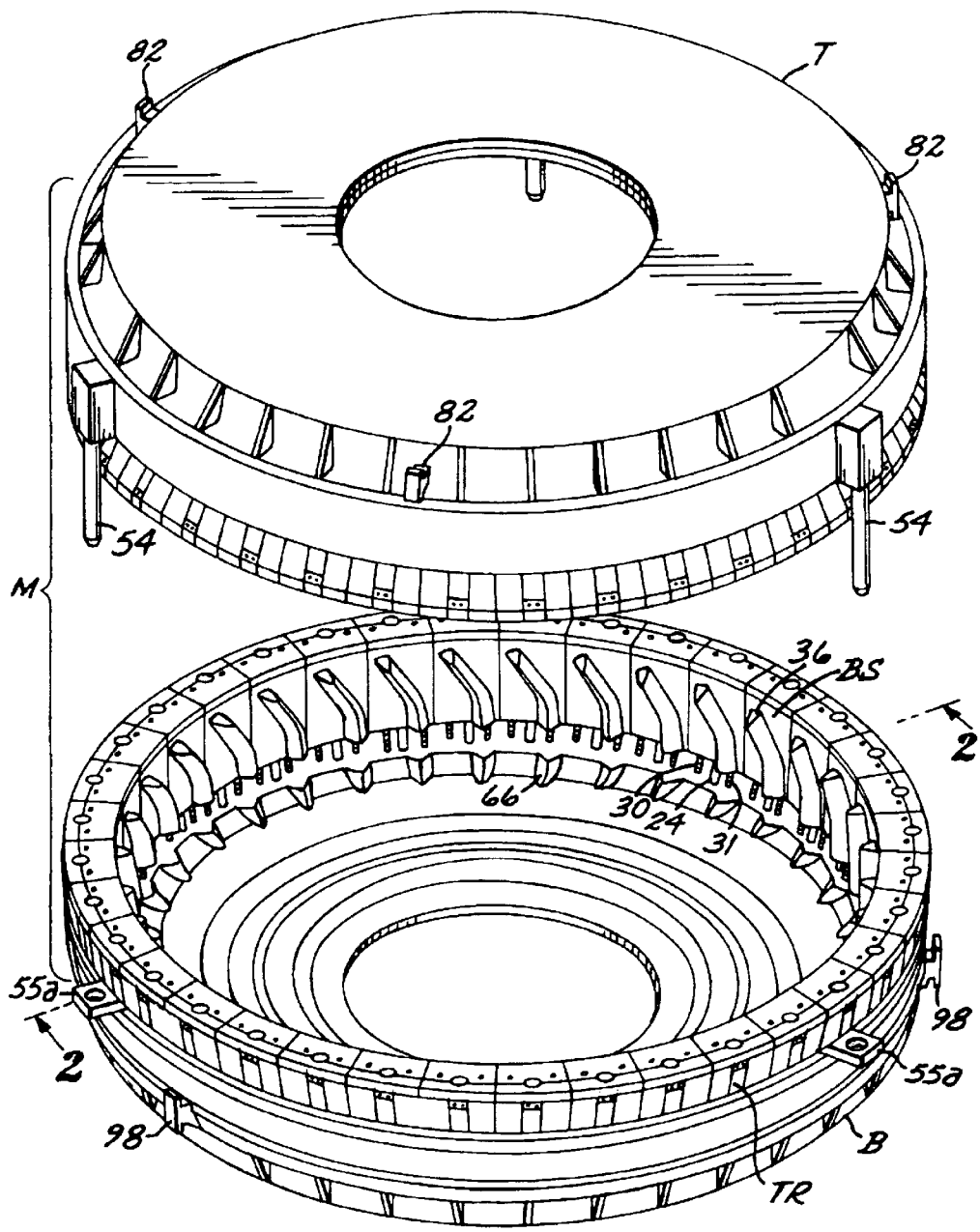
FIG. 1 is a perspective view of a segmental tire mold having aluminum tread segments provided with tear resistant shields embodying the present invention.
Figure 1A:
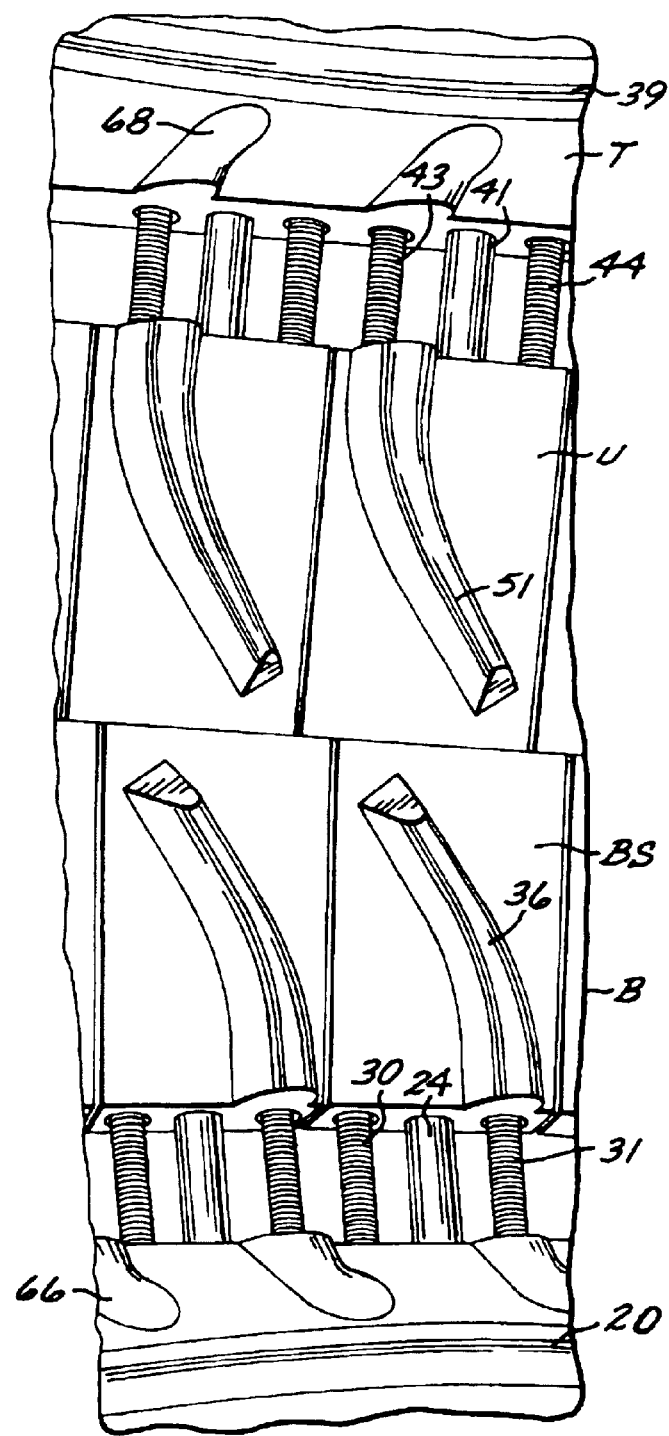
FIG. 1A is a broken side elevational view showing how the tread segments are supported by top and bottom mold segments.

Referring to FIGS. 1–7, there is shown a perspective view of a segmental tire mold M for use in curing pneumatic tires provided with lower and upper aluminum tread segments having tear resistant shields TR embodying the present invention. The entire molding apparatus is generally toroidal in shape, corresponding to the shape of the tire to be cured therein, and includes a bottom mold section B and atop mold section T. As shown in FIGS. 2–7, the bottom mold section B includes a horizontally extending base plate 20 integrally formed with an outwardly and upwardly extending peripheral bowl 22. The upper mold section T includes a downwardly extending bowl 23. In the interest of clarity the tear resistant shields are not shown in FIGS. 2–7. The bowl 22 encompasses a plurality of bottom tread segments BS of like configuration, while the bowl 23 encompasses a plurality of top tread segments TS of like construction. Each bottom tread segment is supported by an upwardly and outwardly extending guide rod 24 which is anchored to the base plate 20, as indicated at 26. Guide rods 24 are slidably received in complementary passages 27 in their respective tread segment. A pair of coil compression springs 30 and 31 are disposed on either side of each guide rod, with the upper portion of such coil spring being supported within a cylindrical cavity 33 that is coaxial with its respective spring by a support pin 35. The lower end of each rod is anchored to the mold base plate 20. The radially inner surface of each bottom tread segment is formed with a radially inwardly extending male lug 36 which is adapted to mold the generally horizontally extending portion of the groove 38 defining the one side of the tread pattern of a cured tire R.

Figure 4:
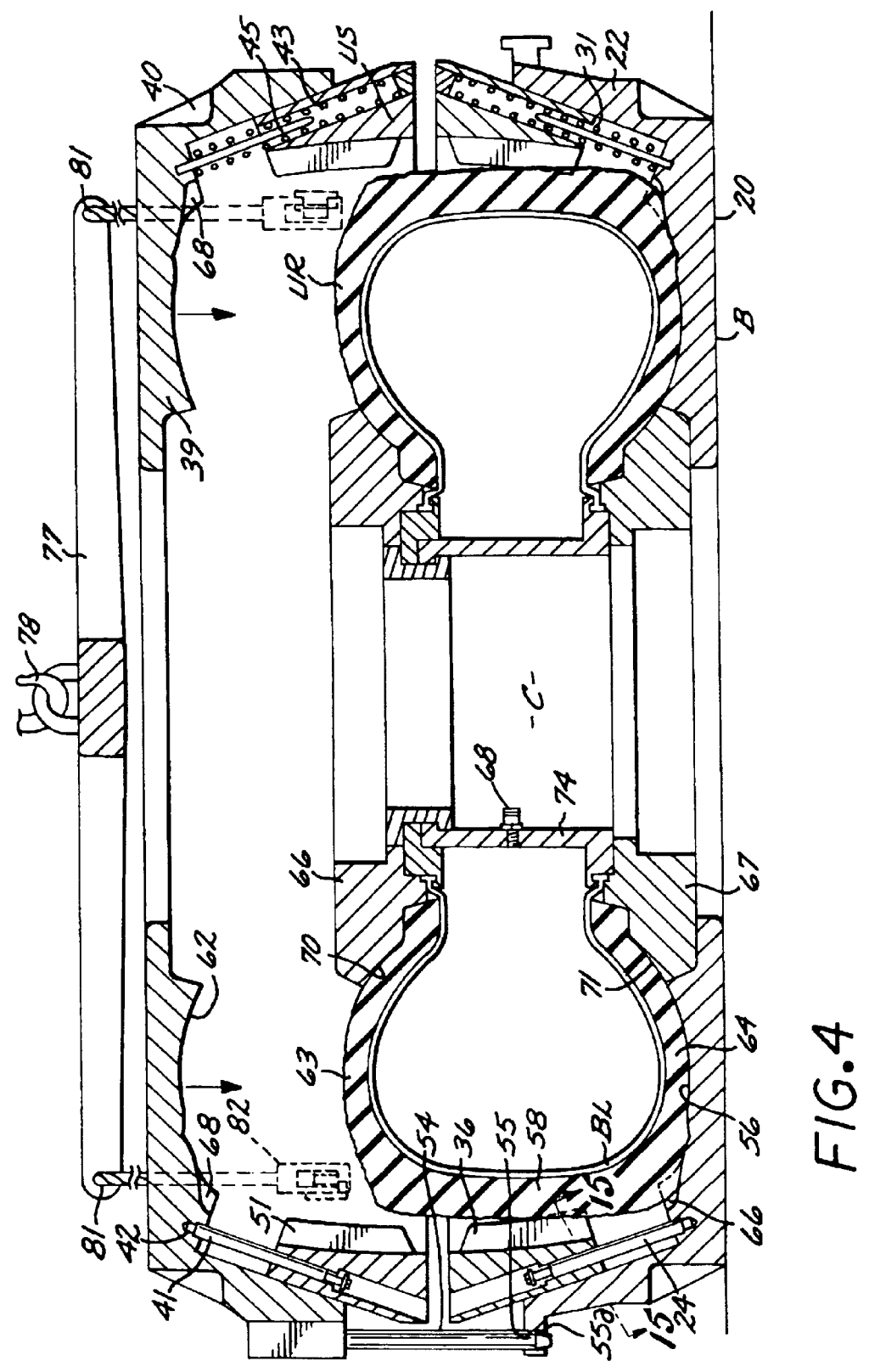

As shown in FIG. 4, the top mold section T includes a top plate 39 formed with an integral downwardly and outwardly extending peripheral bowl 40. Bowl 40 supports a plurality of upper tread segments US similar to but mirror images of the bottom tread segments BS. Each upper tread segment is supported for vertical and horizontal movement by a downwardly and outwardly extending guide pin 41, having its upper end anchored to the top plate 39, as indicated at 42. A pair of coil compression springs 43 and 44 are disposed on either side of guide pins 41, with the lower portion of each of such springs being supported within a cylindrical cavity 45, by a rod 50. The lower end of each is secured to the top plate 39. The radially inner facing surface of each upper tread segment US is formed with a radially inwardly extending male lug 51 which is adapted to mold the horizontally extending portion of the groove 53 defining the opposite side of the tread pattern of cured tire R. The upper and lower mold sections are guided for vertical reciprocal movement by means of a plurality of vertically extending guide bars 54. The upper end of each guide bar is rigidly secured to the bowl 40 of the top plate 39, with the lower end of each guide bar being slidably disposed within a vertically extending bore 55 formed in a peripheral flange 56a of the bottom mold section bowl 22. The top and bottom tread segments US and BS are arcuate and collectively form a circular pattern corresponding to the shape of the tire to be cured when positioned abutting one another. The upwardly-facing side wall surfaces 56 of plate 20 and the downwardly-facing side wall surfaces 62 of top plate 39 form the upper and lower side walls 63 and 64 of the tire to be cured when the top mold is closed on the bottom mold section. The mold top and bottom sections are preferably constructed of steel and the top and bottom tread segments are constructed of aluminum.

With continued reference to FIGS. 1–7, base plate 20 is formed at its outer portion with a plurality of auxiliary lugs 66 that define a downward extension of lugs 36 of each bottom tread segment 35. Similarly, the top plate 39 is formed at its outer portion with a plurality of auxiliary lugs 68 that define an upward extension of lugs 51 of the upper tread segments US. A segmental mold generally corresponding to the above segmented mold is shown and described in my aforementioned co-pending patent application Ser. No. 09/948,398, filed Sep. 16, 2001, now U.S. Pat. No. 6,632, 393.

Figure 2:
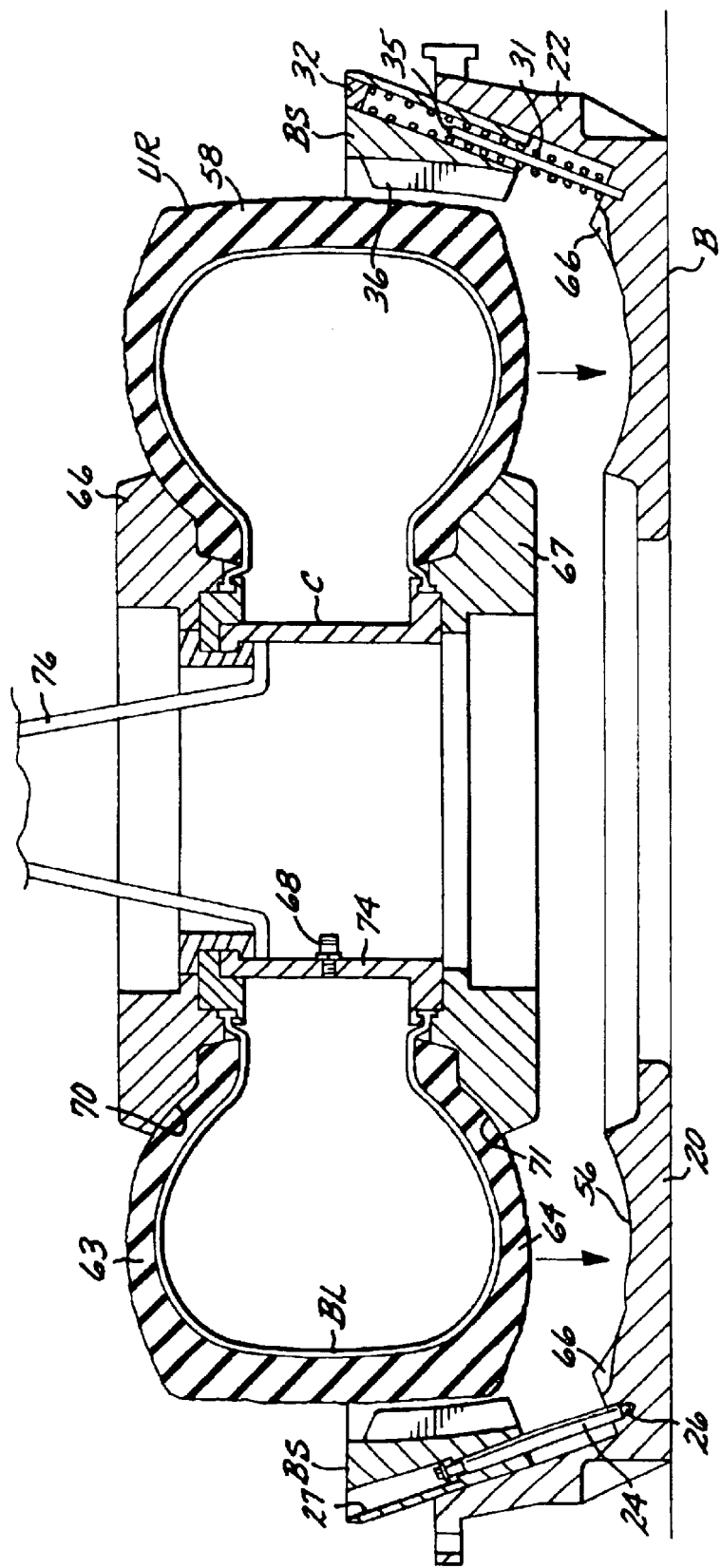
FIG. 2 is a vertical sectional view taken in enlarged scale along line 2—2 of FIG. 1 when a tire to be cured is being lowered into the confines of the bowl of the bottom mold section.

As indicated in FIG. 2, a tire UR to be cured is supported during the curing process by an annular tire carrier C having complimentary upper and lower bead rings 66 and 67 formed with opposed mirror-image surfaces 70 and 71 that conform to the shape of the bead and inner sidewall portions of a tire to be cured. A conventional inflatable curing bladder BL is sealingly clamped between the bead rings and a vertically extending sleeve 74 that connects the bead rings 66 and 67. Sleeve 74 is provided with a fluid inlet and outlet fitting 68 in a conventional manner.

Figure 3:
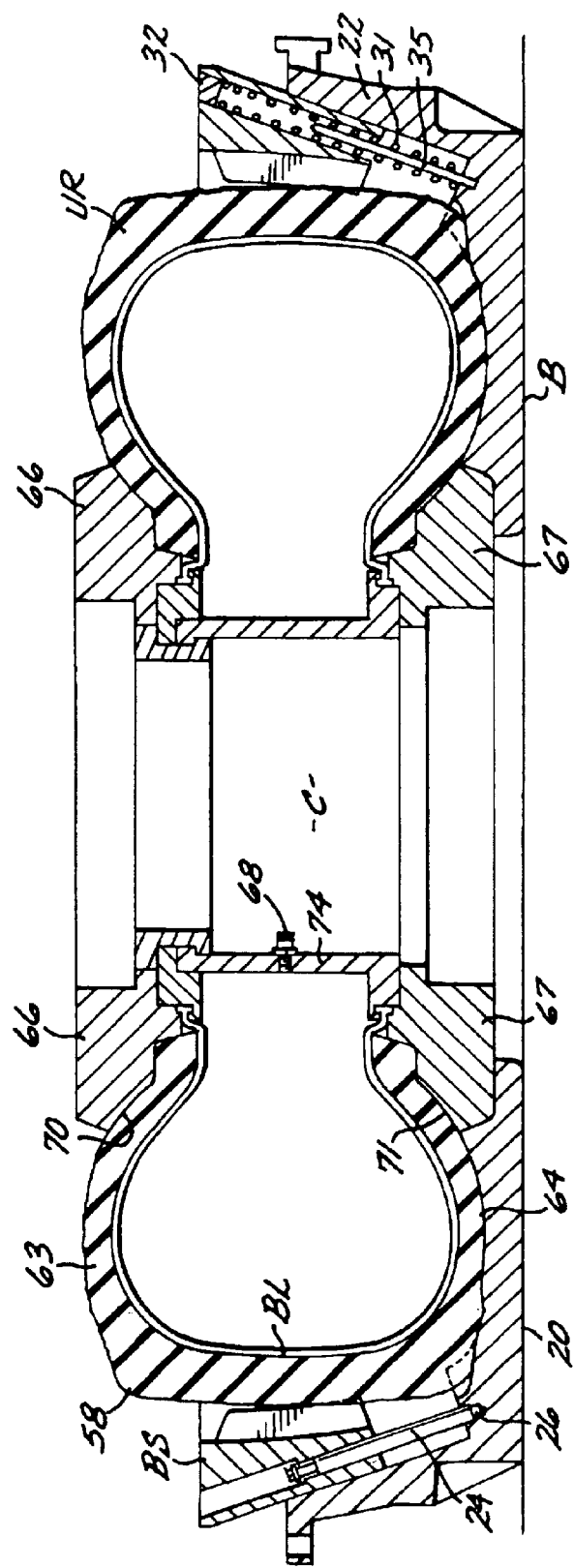
FIG. 3 is a view similar to FIG. 2 showing the uncured tire disposed in the bottom mold section bowl.

In the operation of the aforedescribed apparatus, referring first to FIG. 2, with the top mold section T removed, a conventional hoist (not shown) lowers the uncured tire body UR into the bottom mold section B by a disengageable connector 76. The uncured tire body is maintained partially inflated at a pressure of about 3 to 6 pounds during the loading process in a conventional manner as by water or air forced into bladder B through fitting 68. At this time, the bottom tread segments BS will be maintained in their uppermost position by springs 31. In this position of the bottom tread segments, the lugs 36 thereof are spaced radially outwardly of the extreme periphery of the uncured tire. Referring now to FIG. 3, the uncured tire body UR is shown resting upon sidewall surfaces 56 of the base plate 20, with the tire lifter 76 removed. In FIG. 4, the top mold section T is shown spaced above the bottom mold section BL, and being lowered towards such bottom section as by a three-leg lifting arm 77 supported by a hoist hook 78. The ends of the bar 77 are each connected to a cable 81, the lower ends of which are releasably attachable to lifting lugs 82 (FIG. 1) formed on the top mold section.

Figure 5:
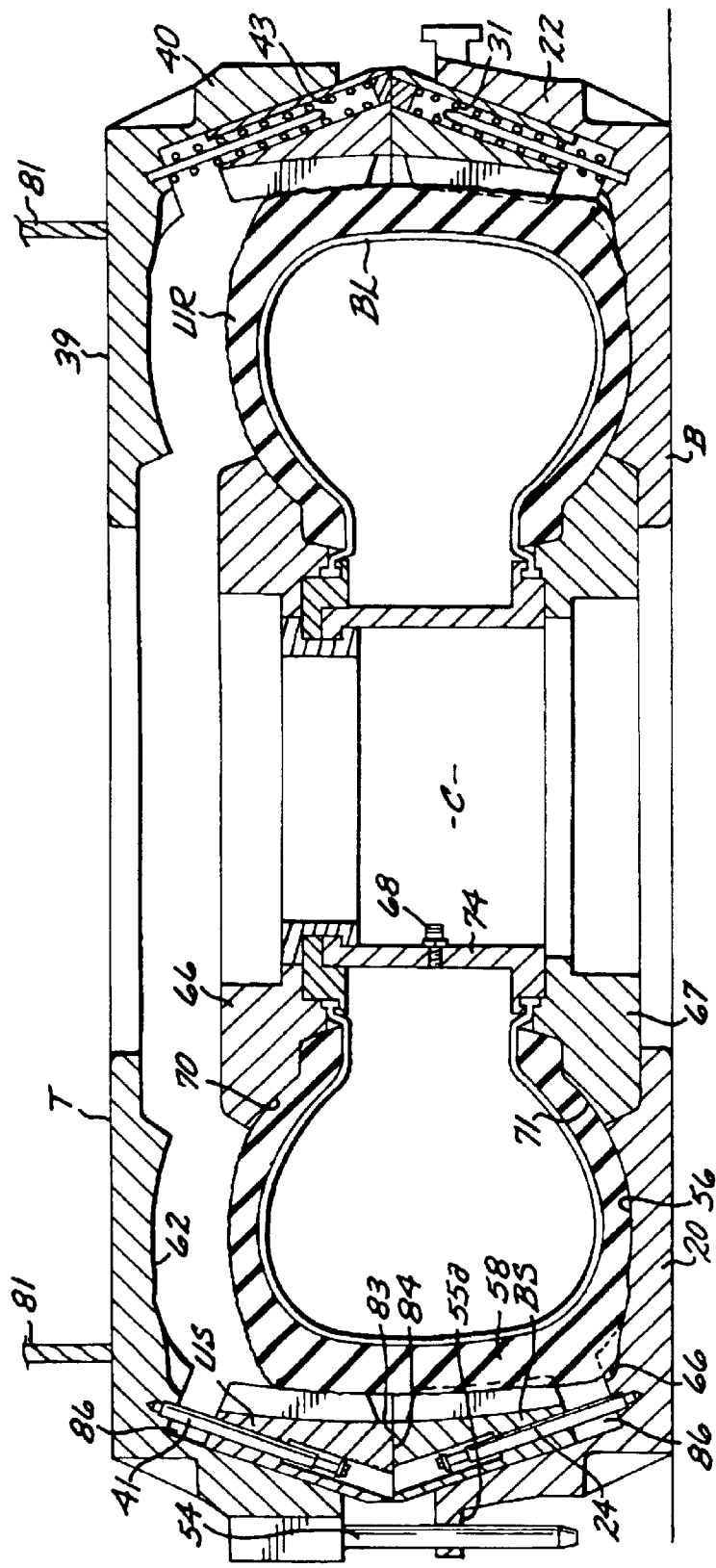
FIG. 5 shows the top mold section in a further lowered position with respect to FIG. 4.
Figure 6:
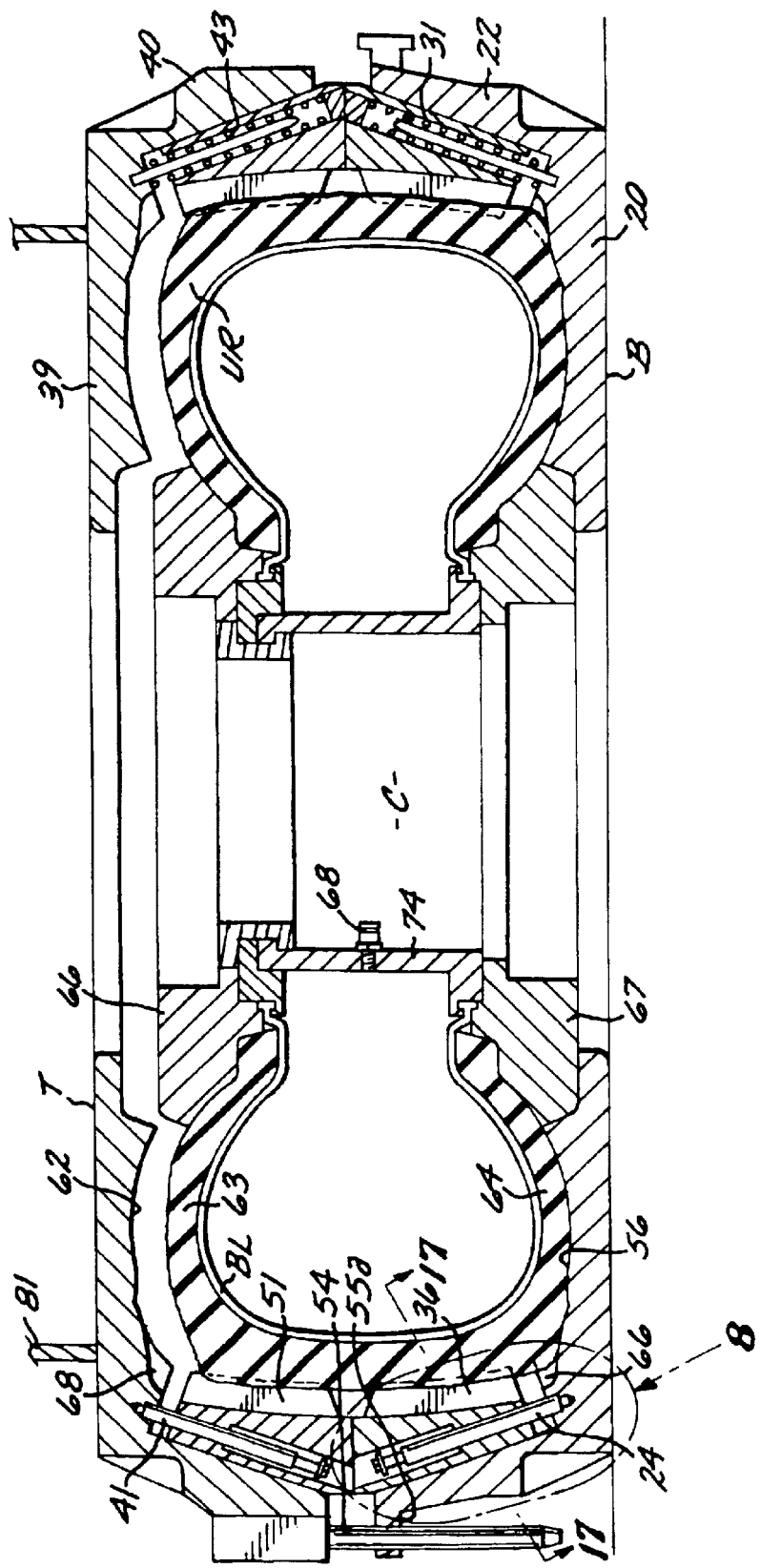
FIG. 6 shows the top mold section adjacent the bottom mold section in a still further lowered position with the tread forming lug of the tread segments engaging the uncured rubber of the outer portion of the tire being cured.
Figure 7:
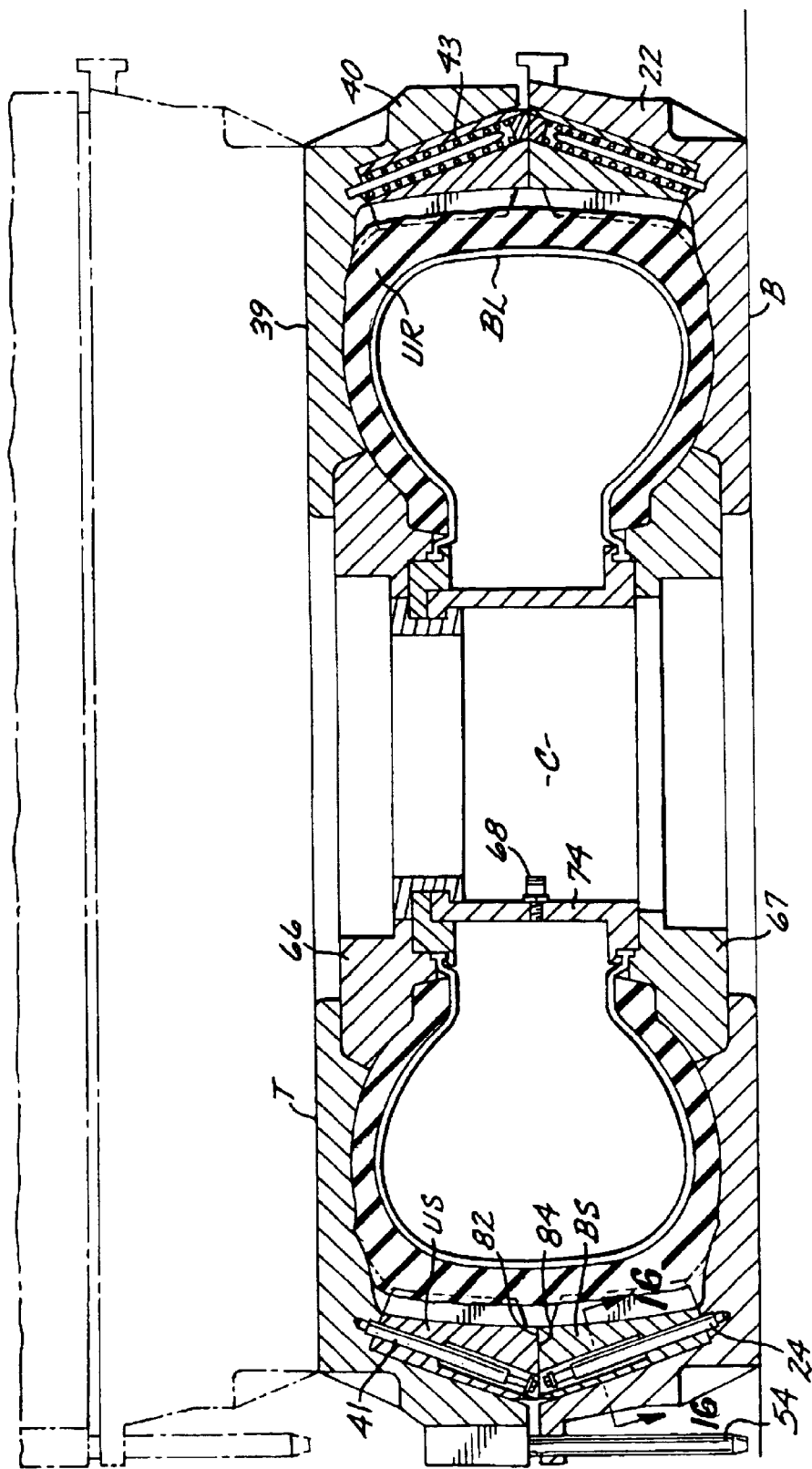
FIG. 7 is a side elevational view showing the top and bottom mold sections in their fully closed position.

Referring to FIG. 5, as the top mold section continues its downward movement, the flat lower end 83 of each of the upper tread segments US will engage the flat upper end 84 of each of the bottom tread segments BS. Such engagement causes the top and bottom tread segments to be cammed radially inwardly by the slanted camming surfaces 85 and 86 formed on the bowls 22 and 40 of the top and bottom mold sections. Such radially inward movement of the tread segments forces the lugs 36 and 51 partially into the uncured rubber of the tread portion 58 of the uncured tire. It should be understood that the pliable uncured rubber permits the lugs 36 and 51 to move the uncured casing inwardly while partially forming grooves in the uncured rubber. In FIG. 6, the top mold section T has been further lowered into the confines of the bottom mold section B. It will be noted that the tread segment lugs 36 and 51 have been urged deeper into the uncured rubber of the tread pattern. At this time the complete mold M comprising the top and bottom mold sections may be transferred to an autoclave (not shown) wherein the top mold section T is forced downwardly into the molding engagement with the upper surface of the uncured tire body TR. The closed mold M is then heated to thereby effect curing of the tire's rubber.

Figure 15:
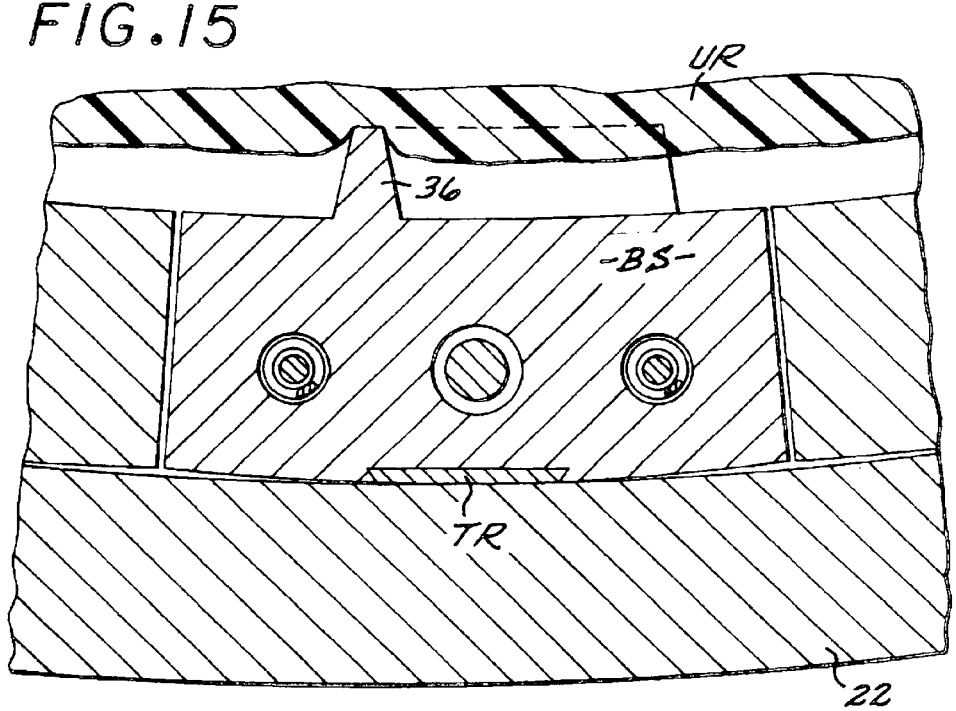
FIG. 15 is a horizontal sectional view taken in enlarged scale along line 15—15 of FIG. 4.
Figure 16:
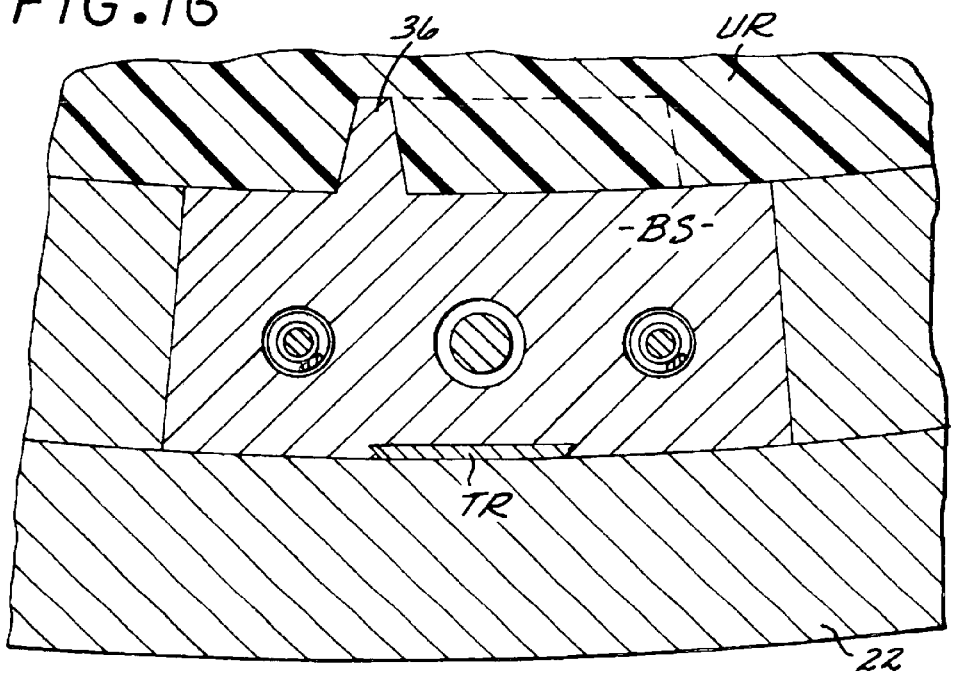
FIG. 16 is a horizontal sectional view taken in enlarged scale along line 16—16 of FIG. 7.

It should be understood that each of the bottom tread segments BS of the bottom mold section, and each of the top tread segments US are likewise provided with such tear resistant shields. are provided with tear resistant shields TR in accordance with the present invention. Referring now to FIGS. 2–7, 11, 15, and 16, tread segments BS are shown during their downward travel between the upper open position of the bottom mold section BL and the closed lower position thereof. In FIGS. 2, and 11, the tread segments are shown spaced radially outwardly of the tire T. In FIGS. 6 and 15 the tread segments are shown after they have traveled downwardly to their closed position at the lower end of the bottom mold section bowl. In FIGS. 6 and 15, the tread segments are shown at the intermediate portion of their downward travel within bowl 22. It will be noted that the width of sliding contact between the outer surface of the tread segments and the inner surface of bowl 22 varies as the tread segments travel downwardly. At the upper end of such travel the width of sliding contact is narrow, while at the bottom of such travel, the curvature of the outer surface of the tread segments approximate the curvature of the inner surface of the bowl so that the width of contact between the outer surface of the tread segments and the inner surface of the bowl is approximately equal, as shown in FIG. 16. The relationship between the upper tread segments US and the top mold section T is similar to that described above with respect to the bottom tread segments BS and the bottom mold section BL.

Referring now to FIGS. 8, 8A, 9, and 10, there is shown a prior art segmented mold M-PA having a bottom mold section B-PA utilizing tread segments TS-PA which are not provided with a tear-resistant shield TR of the present invention. The bottom mold section and its parts should be considered to be of the same construction as the bottom mold section and its parts described hereinbefore. These drawing figures correspond to the approximate vertical position of the tread segments TS-PA in FIGS. 6 and 15, i.e., at the intermediate position of their downward travel. At such intermediate position the lugs 36-PA of the tread segments are shown engaging and pushing radially inward on the uncured circumferential area of the tire UR being molded so as to cause such uncured rubber to force the tread segments radially outwardly with considerable pressure. Simultaneously, downward movement of the tread segments creates a radially inwardly directed force upon the tread segments due to the camming action of the sloping sidewalls 56-PA of the bowl 22-PA. Accordingly, the center portion of the tread segments TS-PA generate a high magnitude of friction with respect to the bowl's inner surface as they slide downwardly and radially inwardly along the bowl's inner surface.

Figures 8, 8A:
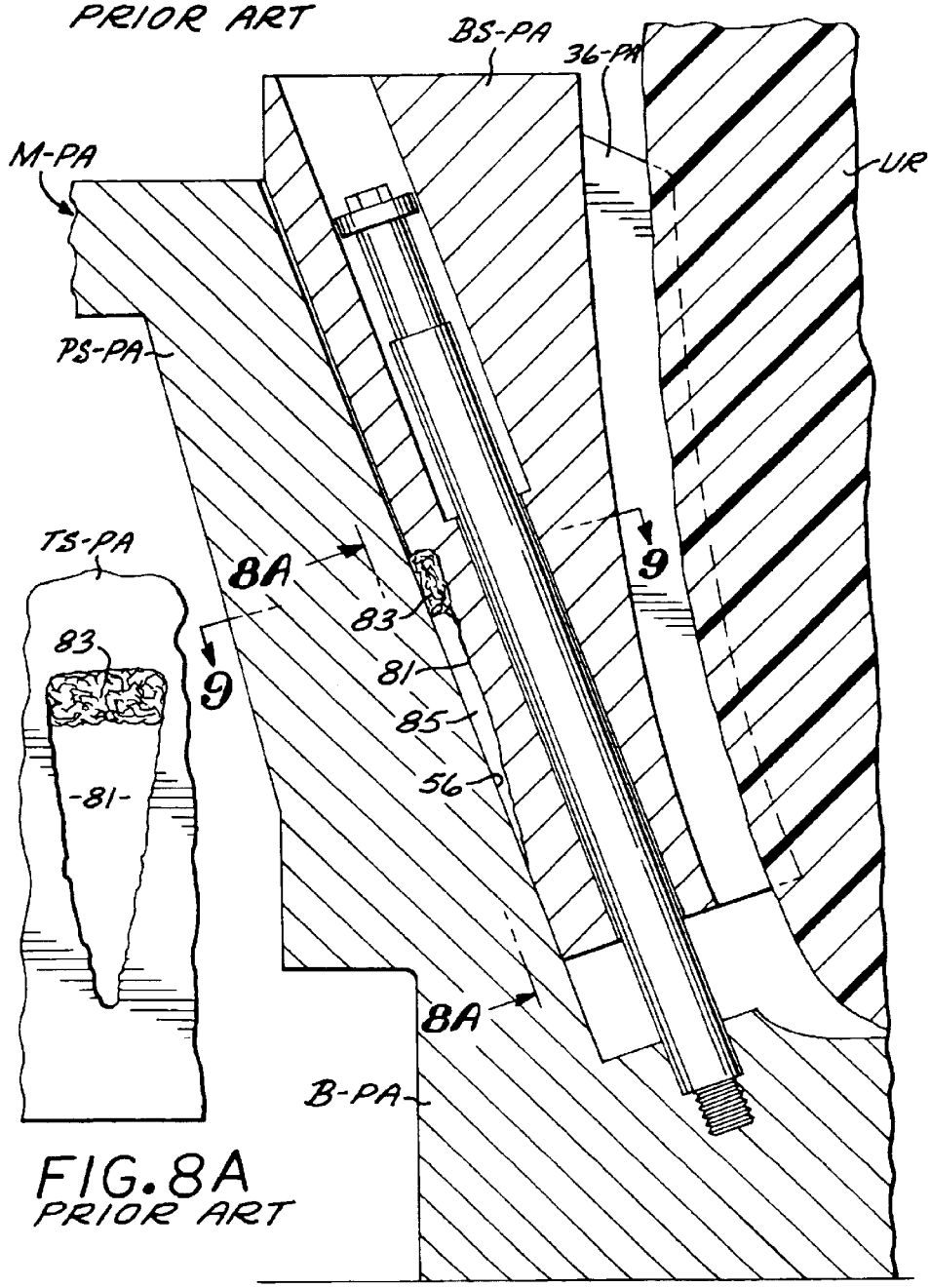
FIG. 8 is an inclined sectional view taken in enlarged scale showing a representative prior art segmented mold wherein the tread segments thereof are not provided with a tear resistant shield of the present invention and the tread segment material has been torn away by binding to the steel bowl of the lower mold section.
FIG. 8A is an inclined view taken along line 8A—8A of FIG. 8.
Figure 9:
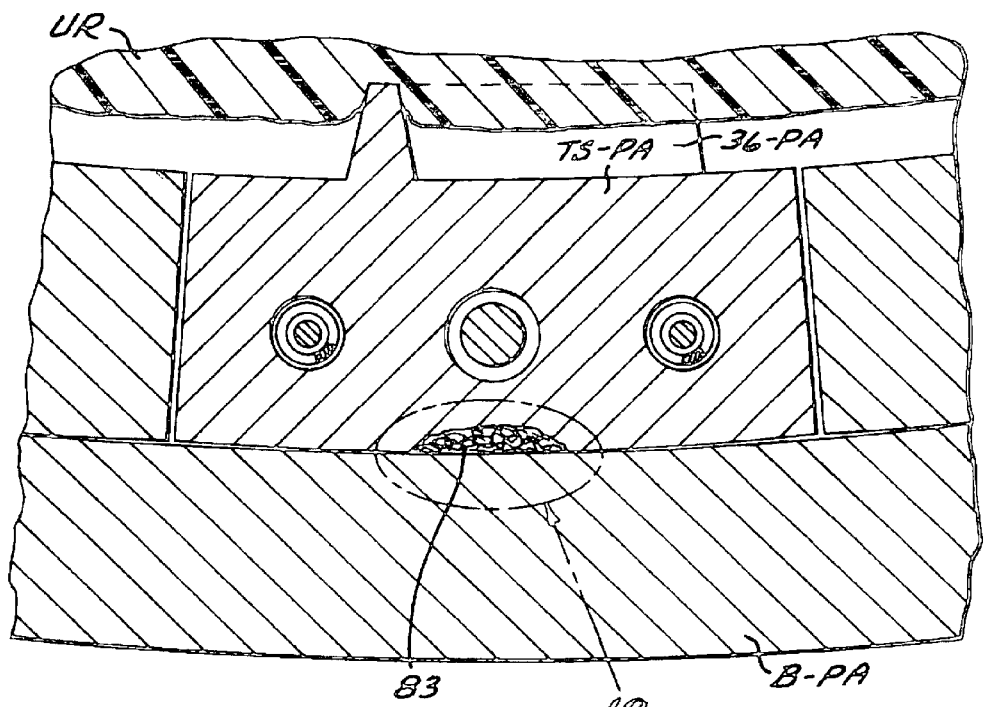
FIG. 9 is an inclined sectional view taken along line 9—9 of FIG. 8.
Figure 10:
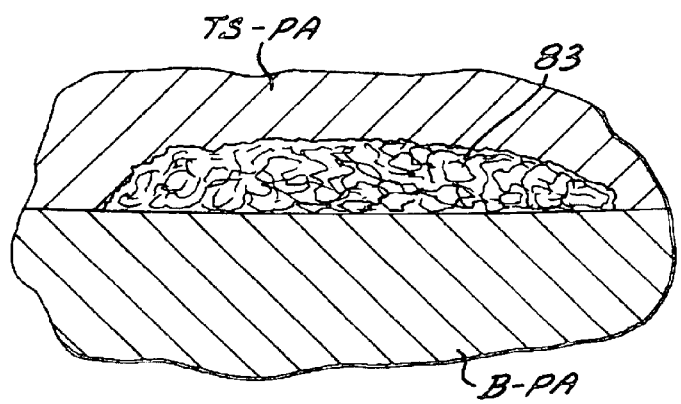
FIG. 10 is a sectional view taken in enlarged scale of the encircled area designated 10 in FIG. 9.
Figure 13:
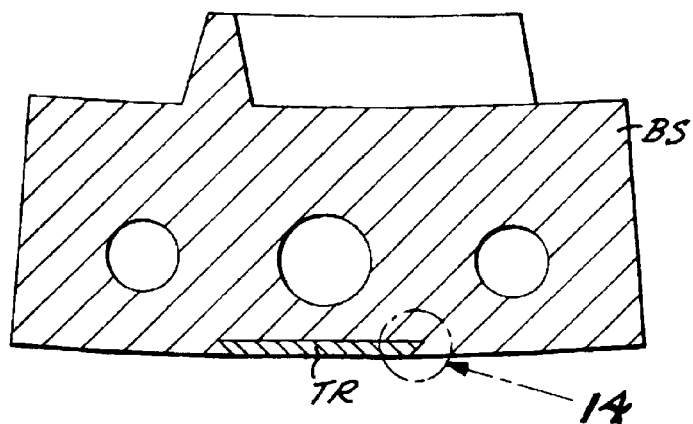
FIG. 13 is a horizontal sectional view taken along line 13—13 of FIG. 12.
Figure 14:
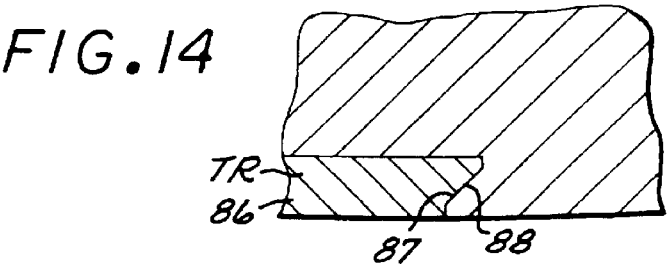
FIG. 14 is an enlarged view of the encircled area designated 14 in FIG. 13.

In FIGS. 8–10, the result of such friction is depicted, namely a small area 81 of the aluminum material on center portion of the outer surface of tread segment TS-PA has instantaneously bonded to the inner surface 56 of the steel material of the lower mold segment bowl 22-PA radially outwardly of the tread surface. Such binding has caused particles 83 of the tread segment aluminum material to be torn away from the outer surface of the tread segment and ball-up in the space between the outer surface of the tread segments and the inner surface of the sloping sidewalls 56 of the bowl B-PA. The balled-up aluminum particles 83 wedge the affected tread segment TP-PA away from contact with the inner surface of such sloping sidewalls. In this manner a gap 85 is created between the outer surface of the affected damaged tread segment and the adjoining inner surface of the bowl B-PA. Such gap 85 blocks the flow of heat from the bottom mold section B-PA to the affected tread segment. This blockage can adversely affect even curing of tire T around its circumference. Also, building up of the aluminum particles 83 wedge damaged tread segment TP-PA radially inwardly away from the inner surface of bowl B-PA. The tread segment TP-PA therefor forms an indentation in the rubber of the peripheral area of the tire UR resulting in an out-of-round tire. To correct this problem it is necessary to remove the damaged tread segment from the mold bowl, file off the balled-up aluminum particles 83, apply new lubricant to the rear surface of the tread segments as well as the inner surface of the mold section bowl, and replace the repaired tread segment in the bowl. Such corrective operations are labor intensive and also preclude use of the segmental mold during such tread segment. In extreme cases it may be necessary to replace the damaged tread segment. FIG. 18 shows a damaged tread segment TS-PA being lifted out of the lower bowl 20 by a crane 84 for repair of the inner surface of such tread segment.

It should be understood that the same type of damage can occur with respect to the upper bowl section during closing movement of the upper tread segments within the upper bowl 23, requiring repair of the damaged tread segment.

Referring now to FIGS. 11–17, the tear resistant shield TR for the bottom tread segments BS embodying the present invention preferably takes the form of an elongated plate 86 which is removably secured within a complementary vertically extending open-topped cavity 87 formed in the outer surface of each tread segment BS. The side and bottom edge of the plate are beveled at 88 to fit within complementary bevels 89 formed in the cavity 87 radially outwardly of the tread segment. The upper end of the plate 86 is horizontally configured and is provided with bores 90 which receive screws 92 that extend into threaded blind bores 94 formed in the upper portion of each tread segment. The shields are fabricated from a non-metallic material which has a lower coefficient of friction than aluminum, steel, iron or copper. By way of example, a high temperature resistant polyester based aramid fiber reinforced laminate material sold under the trademark LUYTEX® C 324 marketed by Busak Shamban, Inc., 2531 Bremer Avenue, Fort Wayne, Ind. has proven satisfactory.

Figure 17:
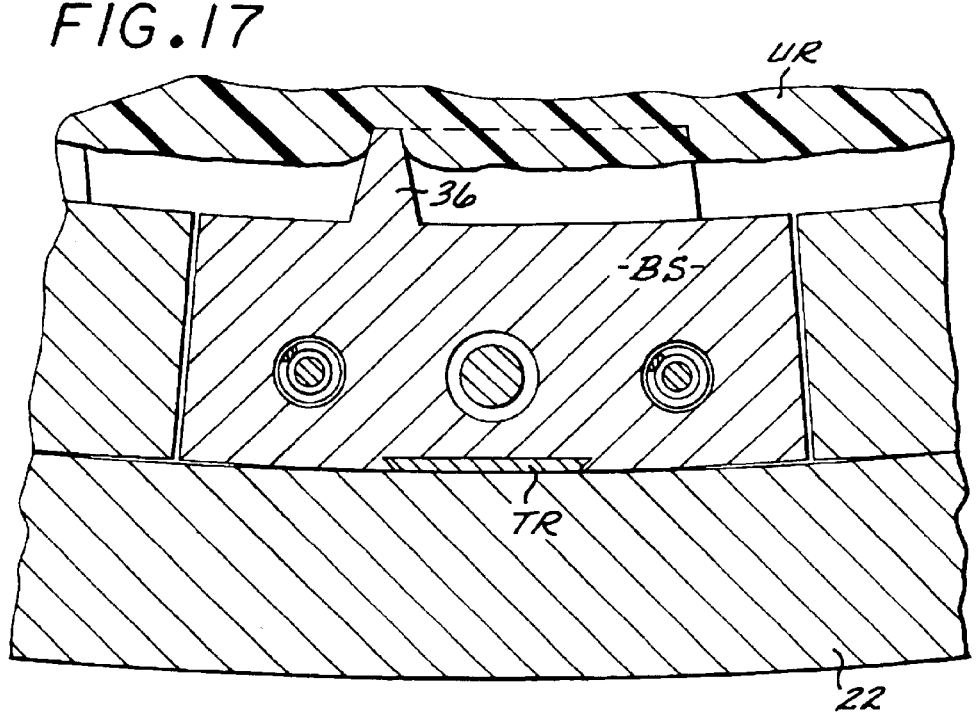
FIG. 17 is a horizontal sectional view taken in enlarged scale along line 17—17 of FIG. 6.

Referring now to FIG. 17, a tread segment TS provided with a tear resistant shield TR is shown arranged at approximately the same vertical position as the prior art tread segment TP-PA shown in FIGS. 8, 8A, 9, and 10. It should be understood that the shield TR protects the outer surface of the tread segment BS from tearing away, as can happen with prior art tread segments during downward vertical movement of the tread segments from their upper open position to their lower closed position, because the material of the shield will not bond to the inner surface of the steel bowl. Shield TR may be readily replaced when the tread segment BS is disposed in a raised position wherein the shield is partially exposed, as shown in FIG. 18, whereafter the screws 92 are unthreaded from bores 90 and 94 and the shield is slid vertically upwardly out of the upper end of cavity 86 to be replaced with a new unworn shield (not shown). The shields TR are moved into a partially exposed raised position as by the springs 31 shown particularly in FIGS. 1 and 2.

It should be understood that the upper tread segments are formed with cavities to removably receive tear resistant shields in a manner similar to that described with respect to the lower tread segments.

It will be recognized by those skilled in the art that use of tear resistant shields of the present invention eliminate the need to remove a torn prior art tread segment from its mold section for repair or replacement and thereafter return the tread segment to such mold segment.

While a particular form of the invention has been illustrated and described, it will also be apparent to those skilled in the art that various modifications can be made without departing from the spirit and scope of the invention. By way of example, a segmented mold provided with the above-described tear resistant shields may be heated within a conventional tire curing press rather than within an autoclave. Accordingly, it is not intended that the invention be limited except by the appended claims.

What is claimed is:

1. In a segmented mold having a plurality of tread segments vertically slidably disposed in a frusto-conical bowl, a tear resistant shield secured to the center portion of the outer surface of each tread segment to prevent bonding of such tread segments to the inner surface of the bowl wherein the shields are formed of a non-metallic material having a lower coefficient of friction than the material of the bowl.

2. The combination of claim 1, wherein the non-metallic material is a high temperature resistant polyester based aramid fiber reinforced laminate.

3. The combination of claim 1, wherein the tear resistant shields each take the form of an elongated plate which is removably slidably secured within a complementary vertically extending cavity formed in the outer surface of each tread segment, such cavity having an open end to receive a shield.

4. The combination of claim 2, wherein the tear resistant shields each take the form of an elongated plate which is removably slidably secured within a complementary vertically extending cavity formed in the outer surface of each tread segment, such cavity having an open end to receive a shield.

5. The combination of claim 3, wherein the edges of each plate are beveled to fit within complementary bevels formed in the side and bottom edges of each cavity.

6. The combination of claim 5, wherein the non-metallic material is a high temperature resistant polyester based aramid fiber reinforced laminate.

7. The combination of claim 4, wherein the edges of each plate are beveled to fit within complementary bevels formed in the side and bottom edges of each cavity.

8. A segmented mold comprising:
    a frusto-conical bowl;
    a plurality of tread segments vertically slidably disposed in the bowl;
    spring means interposed between each tread segment and the bowl to move the tread segments into a partially exposed position relative to the bowl;
    a tear resistant shield secured to the center portion of the outer surface of each tread segment to prevent bonding of such tread segments to the inner surface of the bowl wherein the shields are farmed of a non-metallic material having a lower coefficient of friction than the material of the bowl;
    each tear resistant shield including an elongated plate which is removably slidably secured within a complementary vertically extending cavity formed in the inner surface of the respective elongated plates, such cavity having an open end to receive a shield; and
    wherein the spring means move the tread segments into a partially exposed position relative to the lower bowl so the elongated plates can be slid vertically out of their respective cavities.

9. The combination of claim 8, wherein the non-metallic material is a high temperature resistant polyester based aramid fiber reinforced laminate.

* * * * *